United States Patent [19]

Cahn

[11] Patent Number: 4,839,056
[45] Date of Patent: Jun. 13, 1989

[54] RECOVERY AND CONCENTRATION OF AQUEOUS ACIDS AND BASES

[76] Inventor: Robert P. Cahn, 799 Ridgewood Rd., Millburn, N.J. 07041

[21] Appl. No.: 201,632

[22] Filed: Jun. 2, 1988

[51] Int. Cl.$^4$ .............................................. B01D 13/00
[52] U.S. Cl. ..................................... 210/643; 210/909
[58] Field of Search ...................... 210/643, 634, 909; 204/254, 268, 294

[56] References Cited

U.S. PATENT DOCUMENTS 4,283,290  8/1981  Davies ................................. 210/643

Primary Examiner—Frank Spear

[57] ABSTRACT

A process for removing and recovering a dissolved substance, either acid or a base, from an aqueous feedstream. The feedstream is contacted with an aqueous dispersed phase containing liquid membrane emulsion which removes the dissolved substance to the degree desired from the feedstream and absorbs it into the liquid membrane emulsion. The aqueous dispersed phase of the emulsion comprises a reagent which reacts with the dissolved substance by neutralization, allowing the dissolved substance to accumulate to a significant concentration in the emulsion before the spent emulsion is separated from the treated feed and coalesced into a membrane and a spent aqueous internal reagent phases. The spent aqueous internal reagent phase is subjected to electrolysis in a bipolar membrane cell which regenerates the dispersed reagent loaded internal aqueous phase in a composition suitable for recycle to emulsification and further feedstream treatment. The bipolar cell also generates an aqueous stream rich in dissolved substance from which the extracted dissolved substance can easily be recovered in pure form by conventional separation means.

15 Claims, 2 Drawing Sheets

RECOVERY AND CONCENTRATION OF AQUEOUS ACIDS AND BASES

BACKGROUND OF THE INVENTION

The invention relates to the selective removal of dissolved acids or bases from aqueous solutions and their subsequent recovery in concentrated form. This is achieved by a combination of liquid membrane extraction using a selective reagent and by bipolar membrane electrolysis of the spent selective reagent.

It is known in the art that liquid membrane emulsions may be used to remove dissolved substances from aqueous solutions; see for example, U.S. Pat. Nos. 3,617,546; 3,637,488; and 3,779,907. The emulsion is characterized as having a dispersed or internal phase suspended in a continuous phase. The continuous phase of the emulsion is immiscible with the aqueous solution but is permeable to the dissolved substance. The dispersed phase, which usually is miscible with the aqueous phase, contains a reagent which cannot permeate through the continuous phase, but is capable of reacting with the dissolved substance when it reaches the dispersed phase to form a product which cannot permeate back through the continuous phase. The emulsion is contacted with the aqueous solution, whereupon the dissolved substance permeates through the continuous phase into the dispersed phase and is retained therein.

One way to achieve this conversion of the dissolved substance, after it has permeated into the dispersed phase, into a form in which it is incapable of permeating back through the immiscible continuous phase (i.e. the liquid membrane), is by neutralization. Another method is to form a precipitate. Thus, if the dissolved substance is phenol, which is permeable in its undissociated form through an oil liquid membrane phase, it can be extracted from a dilute aqueous solution using aqueous caustic encapsulated in a water-in-oil liquid membrane emulsion. When the phenol, after permeating through the oil membrane, reaches the dispersed caustic droplets, it is neutralized by the caustic, forming sodium phenate. The phenate ion is insoluble in oil, and, therefore, cannnot permeate back into the external dilute aqueous solution. Thus, by neutralization of the weak acid, phenol, it can be removed from a dilute aqueous solution by means of a liquid membrane emulsion containing a base.

However, it is clear that continued removal of this acid is limited by the amount of base present in the liquid membrane emulsion. As the base becomes consumed (by neutralization), the concentration of undissociated phenol in the caustic solution increases, resulting in less than complete removal of the phenol from the dilute aqueous solution. The reason for this is that the driving force for the permeation of the phenol through the liquid membrane is determined by the difference in concentrations of undissociated phenol in the dilute aqueous solution and the caustic solution. Once that difference shrinks, the motivation for the phenol to permeate into the liquid membrane emulsion disappears.

Consequently, removal of the spent caustic solution, and replacement of the same with fresh caustic in the liquid membrane emusion becomes an essential part of the process. In the past, this has been done in a number of ways, first breaking the emulsion by centrifugal, chemical or electrostatic means, followed by replacing the spent aqueous layer with fresh caustic, and disposing of the spent caustic by a number of alternates. One of these alternates is discarding, with its obvious detrimental environmental effects, since phenol is a toxic material. Fortunately, the volume of spent caustic is several orders of magnitude less than that of the original dilute solution, reducing the cost and inconvenience of the disposal step.

A second method is recovery of the phenol from the spent caustic by treatment with a strong acid, such as sulfuric acid, which will liberate the phenol, leaving behind a solution of sodium sulfate, which is much easier to dispose of than sodium phenate. While this method recovers phenol as a salable product, it requires the use of an additional reagent, e.g. sulfuric acid. Consequently, for each mole of phenol removed, at least one mole of caustic and one half-mole of sulfuric acid are consumed, and returned to the environment as undesirable sodium sulfate. In practice, incomplete utilization of the caustic in the phenol extraction necessitate the use of greater than stoichiometric amounts of both caustic and sulfuric acid.

Another method, and the subject of the present invention, is the splitting up of the sodium phenate salt formed into (1) phenol, which is separated, purified and used as a chemical, and into (2) caustic solution, which is recycled to the phenol removal step by reemulsification to form regenerated liquid membrane emulsion. A preferred method of achieving this splitting up is by the use of bipolar membrane electrolysis, allowing the sodium phenate feed solution recovered from the spent liquid membrane emulsion to be converted into one stream which is rich in caustic, and another stream rich in phenol.

It should be noted that since the stream rich in caustic generated by this technique is reused as recycled regenerated liquid membrane emulsion, it is not necessary to achieve a high degree of purity of the regenerated caustic. Thus, the regenerated caustic can still contain some phenol, provided that there is sufficient unreacted caustic in this stream to make emulsification and reuse worthwhile. By the same token, the regenerated phenol solution need not be entirely free of caustic, since the free phenol will be removed from this solution first by phase separation, followed by steam stripping. Since the presence of excess phenol in this solution ensures that any caustic present will be in the form of sodium phenate, caustic will not go into the liquid phenol phase during the phase separation, or into the vapor phase during the steam stripping step. Splitting a salt into its components by bipolar membrane electrolysis is simplified considerably if the resultant acid and base products need not be pure. Only by combining the bipolar membrane electrolysis with a membrane separation scheme, such as liquid membrane emulsion extraction, can this advantage be realized.

Another advantage of this technique, the combined liquid membrane emulsion extraction and bipolar membrane elecrolysis of the spent internal aqueous phase of the emulsion, is that liquid membrane extraction exhibits selectivity between different dilute acids or bases, allowing separate removal and recovery of different contaminants or solutes present in the dilute aqueous feed solution. Simple direct electrolysis of the dilute feed liquor could not achieve this separation.

Another advantage of this technique is that dilute solutions can be converted into concentrated products, since the liquid membrane extraction step per se is a concentration step, vastly increasing the concentration of the acid or base in the incoming feed. Direct bipolar membrane electrolysis would not achieve such a concentration. Further, electrolysis of a dilute solution has to overcome large resistance losses on account of the low conductivity of dilute aqueous solutions, a problem neatly avoided by the present technique, which electrolyzes a concentrated (e.g., spent caustic) solution.

A further advantage of the present technique is that it allows the use of internal reagents in the liquid membrane system which cannot be considered for environmental or economic reasons in a throw-away situation, such as simple discarding of the spent internal phase of the used emusion. Also, reagents can be used which have better solubility properties than the reagent generally used in a throw-away situation. The use of potassium hydroxide is a case in point, compared to the more usual caustic soda, or, in the case of amine removal, use of hydrochloric rather than sulfuric acid.

A further advantage is that the new combination permits the use of more environmentally acceptable, although more expensive reagents in the internal phase of the emulsion. In conventional liquid membrane treating, a small quantity of the internal phase will leak out into the aqueous phase being treated, resulting in minuscule, yet measurable contamination of the aqueous treating effluent. On the other hand, since the spent reagent has to be discarded, economics usually dictate the use of the lowest cost reagent. Reagent cost and effluent contamination considerations do not necessarily point to the same reagent. With the use of the present invention, cost considerations for the used reagent can be disregarded, making the choice of an environmentally least objectionable reagent so much easier.

Other advantages of the present invention will become apparent in the following description.

In conventional liquid membrane (LM) extraction of, say, a dilute weakly dissociated acid such as phenol, which is somewhat oil soluble, the aqueous liquid feed containing said acid is contacted in an agitated vessel with dispersed globules of a water-in-oil emulsion, where the continuous (oil) phase of the emulsion contains a surfactant and possibly an acid solubilizer, and the encapsulated dispersed aqueous phase of the emulsion contains a base which can neutralize any permeated acid. The undissociated acid will keep on permeating through the oil film into the internal droplets, where the base will convert the undissociated acid into an oil-insoluble salt. This effectively prevents return of the extracted acid into the outside bulk aqueous phase, resulting in accumulation and concentration of the extracted material, albeit in changed form, in the internal droplets. This removal will continue as long as free base remains. The equilibrium governing the removal of a dilute acid or base, e.g. phenol, from an aqueous solution into the concentrated internal reagent of a water-in-oil liquid membrane emulsion is described in the literature, such as by R. P. Cahn and N. N. Li, in "Separation of Phenol from Waste Water by the Liquid Membrane Technique", Separation Science 9(6), pp. 505–519, 1974.

After the extraction has proceeded to the desired extent, the emulsion is allowed to settle away from the treated feed solution which is discarded or subjected to further treatment. The emulsion is broken, using one or a combination of several means of separation, such as centrifugation, agitation, addition of chemicals, or electrostatic coalescence. The preferred method of separating the emulsion phases is by means of an electrostatic coalescer. The internal aqueous phase broken out of the emulsion is further treated as described hereinbelow, while the recovered oil phase is recycled to emulsion making and thus reused directly in the process.

The spent internal reagent solution, comprising salt and left-over (excess) reagent, e.g. base, is now fed to the bipolar membrane electrolysis for recovery of the removed acid in concentrate form, and reforming of the base, allowing its recycle to the extraction process after incorporation into the emulsion. The heart of the bipolar membrane electrolysis is the bipolar membrane, which consists of an anion-permeable anion-exchange resin layer, and a cation-permeable cation-exchange resin layer, sandwiched together. The membrane is also somewhat water permeable. When such a membrane is immersed into an aqueous solution, and a potential is applied across it, water at the interface between the two layers will be split into protons and hydroxyl ions. The protons will migrate through the cation-permeable side (which must be the side closer to the cathode of the applied field) and the hydroxyl ions will drift to the anode via the anion-permeable layer. The cell compartment adjacent to the cation-permeable layer will become enriched in protons, thus turning acidic, while the compartment adjacent to the anion-permeable layer will become enriched in hydroxyl ions, i.e. it will turn alkaline. By a judicious combination of bipolar membranes, cation-permeable membranes and anion-permeable membranes, to be described hereinbelow, it is possible to build up a cell stack, so that when the spent internal aqueous solution is allowed to flow through the appropriate compartments of such a stack, and water through others, and an electric potential is applied across the cell stack, the salt in the spent aqueous solution is electrolytically decomposed into its constituent acid and base, without the evolution of hydrogen, oxygen, or other undesirable by-products of conventional electrolysis. For this reason, bipolar electrolysis requires a much lower voltage per unit cell than conventional electrolysis, about half the voltage or less, with a corresponding saving in electric power consumption.

It is a special advantage of bipolar membrane technology that the spent reagent is regenerated in a form and in a concentration which is sufficiently dilute so that it can be used directly in the reemulsification step for recycle of "regenerated" liquid membrane emulsion. This is frequently not true in conventional electrolysis, which often regenerates either the acid or the base not in its recyclable form, if at all, but in a form which requires considerable further reaction and processing before it can be recycled.

The dissolved substance, which was removed from the dilute aqueous solution feed by means of the reagent-loaded liquid membrane emulsion, is regenerated in the bipolar membrane cell, separated from the reagent, as a much more concentrated aqueous solution than in the original feed. The regenerated dissolved substance, as a result of the separation achieved by the selective liquid membrane extraction, will also be free of other contaminants which accompanied it in the dilute aqueous feed, and which frequently interfere with any attempts to recover it directly from the dilute feed. From the said more concentrated aqueous solution, the dissolved substance can be recovered economically by any number of conventional means such as phase separation, extraction, distillation, steam stripping, etc.

This process is eminently suited to the recovery of dilute acids and bases from aqueous solutions in which they are admixed with other materials, frequently other acids and bases, from which they can be separated by the emulsion liquid membrane technique. Thus, if it is desirable to remove phenol, a slightly acidic compound, from its dilute aqueous solution also containing other acids or their anions, such as sulfuric acid or sulfate ion, chloride, nitrate, phosphate, etc., a preliminary emulsion liquid membrane separation using an aqueous caustic-containing emulsion will pull the phenol selectively out of this dilute solution. The other anions and their respective acids, which are all essentially oil-insoluble, will not permeate into the internal droplets of the emulsion through the oil membrane, effecting a very selective separation of the phenol from the other acids in the original feed. Demulsification of the spent emulsion and bipolar membrane electrolysis of the spent internal aqueous phase of the emulsion will liberate the extracted phenol and regenerate the spent caustic for reuse. Since the concentration of phenol in the spent emulsion can be very much higher than its concentration in the incoming feed, recovery of the phenol as a product is much simpler than if this recovery had been attempted on the incoming feed. Another feature of the present invention, which is demonstrated by this example, is that if bipolar electrolysis of the incoming feed were attempted, the recovered acid would not be just phenol, but would also include sulfuric, hydrochloric, phosphoric and other acids present as such or as their anions in the incoming feed. Not only would this result in a highly contaminated product, requiring further purification, but it would also involve the expenditure of unnecessary quantities of power to regenerate the undesired contaminant acids, e.g. the sulfuric, hyudrochloric and phosphoric acids.

While the separation of phenol from sulfate or chloride is inherent in the differences in oil solubility, and consequently oil permeability of phenol vs. sulfuric, hydrochloric and other inorganic acids, such differences in solubility and permeability can be artificially induced in the system by addition of solubilizers to the liquid membrane, i.e. to the continuous oil phase of the liquid membrane emulsion. Such solubilizers may be oil-soluble clathrating, complexing, chelating or ion exchange materials which may be selective to one or several cations or anions in the aqueous feed. In the case of cations, such materials may be DHPA, di(ethylhexyl) phosphoric acid or a chelating agents for copper, for example LIX64N TM, a material supplied by General Mills Chemical Co, and for anions Amberlite LA-2 TM, an oil-soluble secondary amine manufactured by Rohm & Haas, or other materials which provide the requisite solubility and selectivity to the membrane phase.

In general, most inorganic acids and, of course their anions, are essentially insoluble in the undoped membrane phase, and are consequently prevented from being picked up by the liquid membrane emulsion. On the other hand, organic acids, such as acetic, propionic, butyric, benzoic, and other naphthenic or aromatic acids, phenol etc. are sufficiently soluble in oil to give some permeability to the undissociated form (not the ionic form) of the acid. A few inorganic acids, or their anhydrides, e.g. hydrogen sulfide, carbon dioxide, or sulfur dioxide, have some oil solubility and, therefore, permit selective removal of these acids in the presence of strong acid contaminant such as sulfuric and hydrochloric acids.

The same can be said for cations or their corresponding bases. Alkali and alkaline earth metal ions and their corresponding bases are not soluble in the oil membrane without appropriate doping. On the other hand, ammonia, amines and other basic organic compounds are soluble in oil, and the membrane phase is therefore permeable to these materials, allowing their selective removal from dilute solutions also containing other cationic contaminants like sodium or calcium ions. Just as previously discussed in the case of phenol removal, amines or ammonia can therefore be selectively removed and recovered when present in dilute concentration in a feed also comprising oil-insoluble cations like sodium, calcium, ferric, etc. Attempts to recover the ammonia or amine directly from the feed by bipolar electrolysis would result in wasteful expenditure of electrical power and the formation of a mixture of dilute ammonia or amine together with sodium and calcium hydroxide and other undesirable cationic contaminants. It is, of course, obvious that attempts to remove the ammonia or amines selectively by liquid membrane treatment alone would be successful, but the end product would not be free ammonia or the amine, but the ammonium or amine salt of the acid which was used in the liquid membrane emulsion fed to the treater, and the process would consume acid commensurate with the amount of ammonia or amine removed.

SUMMARY OF THE INVENTION

The present invention is, broadly, a process for removing and recovering a dissolved component from an aqueous feedstream. In order to achieve the removal, the feedstream is contacted with an emulsion which is characterized as having a continuous membrane phase immiscible with the feedstream but in which the dissolved component is somewhat and selectively soluble, and a dispersed aqueous phase in which the extracted component concentrates by reaction with a reagent contained in said dispersed phase. The contacting of the emulsion and the feedstream is performed for a period of time at suitable conditions sufficient for the emulsion to absorb a portion ranging from 20 to 99.99% of the dissolved component. The spent emulsion, which contains the absorbed portion of the dissolved component, is separated from the feedstream. Said spent emulsion is separated by demulsification into its two constituent phases. The previously dispersed aqueous phase is fed to a bipolar membrane electrolysis, where the reaction product of the extracted dissolved component and said reagent is split into two streams, one stream comprising said reagent and another stream comprising said extracted dissolved component. The stream comprising said reagent is reemulsified with the membrane phase separated by demulsification from the spent emulsion and is recycled to the said extraction step. The stream comprising said extracted dissolved component is discarded, or treated further for recovery or concentration of the extracted dissolved component.

DESCRIPTION OF THE PREFERRED EMBODIMENT

The preferred embodiment of the present invention is a process for the removal of a weak acid or base dissolved in the aqueous feedstream. For purposes of the description a weak acid, specifically phenol, is chosen as the dissolved compound, and a strong base, specifically caustic soda, is selected as the reagent. However, it should be understood, that many other weak acids, if they are or can be made soluble in the membrane phase, will behave in the same manner as will be described for phenol. Weak bases, provided the selected reagent is a strong acid, like sulfuric acid, follow an identical pattern. It should also be understood that while the following description is based on the removal of a single compound, several compounds, i.e. several acids or several bases, can be removed at the same time.

Figure 1:
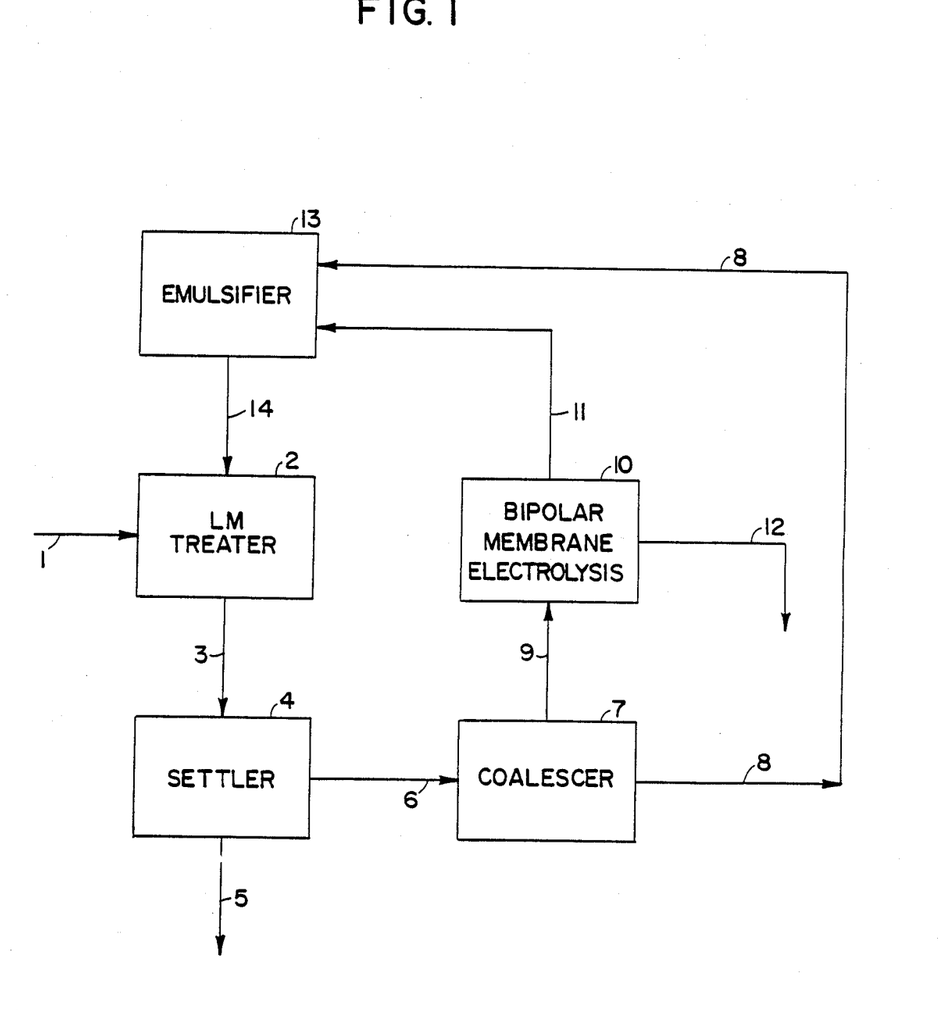
FIG. 1 is a schematic representation of a preferred embodiment of the process of the present invention.

The process is best illustrated in FIG. 1 which shows a schematic of the general flowplan of the invention. Fresh aqueous feed 1 containing a dissolved acid or base, in this case phenol, is fed to liquid membrane (LM) treater 2 where feed 1 is contacted with fresh LM emulsion 14 prepared in emulsifier 13. The emulsion consists of a continuous or membrane phase, which is immiscible with feed 1 and a dispersed phase. The membrane phase is usually a hydrocarbon based composition comprising petroleum-based solvents, such as paraffins, kerosene, naphthenes or aromatics, as well as 0.1-5 wt. % of oil-soluble detergents, such as ENJ-3029, manufactured by Exxon Chemical Co., and, if required, a solubilizer for the compound or ion to be removed, such as LIX64N when copper ion is to be removed, or Alamine, supplied by General Mills Chemical Co. when an oil-insoluble anion is to be removed. In the case of phenol, which is quite oil soluble, no such solubilizer needs to be added to the membrane phase.

The dispersed phase is an aqueous solution comprising a reagent, which will react with the dissolved substance diffusing through the membrane phase into the dispersed internal phase of the emulsion, preventing said substance to diffuse back out again, thus concentrating the dissolved substance in the dispersed phase droplets. In the present case, where phenol is the dissolved substance, said reagent is caustic soda, NaOH, which may be present in the internal phase of the fresh emulsion in a concentration of 1-20 wt. %. Other strong, oil insoluble bases, like KOH, LIOH, $K_2CO_3$, and mixtures of these compounds can be used.

In treater 2, feed 1 and fresh emulsion 14 are contacted in a concurrent or countercurrent manner for a sufficient length of time to assure the desired degree of removal of the dissolved compound, i.e. phenol from the feed. As discussed before, this removal occurs, since the compound, being soluble in the membrane phase of the emulsion, will diffuse through this membrane phase into the internal droplets of the emulsion driven by a concentration gradient of the dissolved compound across the membrane phase, as long as the reagent is available to consume the compound as it arrives in the dispersed droplets, and as long as the concentration of the dissolved compound in the external feed phase is higher than the concentration of this compound in the internal dispersed droplets of the emulsion. In order to maximize this driving force, countercurrent contacting between emulsion and feed is frequently employed.

It is usually desirable to remove more than 80% of the dissolved compound from the feed, usually more than 90%, and often as much as 99, or 99.5%. The time required for removal of the compound to the extent desired depends on the compound, the extent of removal, the treat ratio of emulsion to feed, and the type of contacting and agitation provided in treater 2. The time can vary from the order of 1 minute to as much as 30 minutes.

The minimum amount of emulsion used for the treating step is that which contains just sufficient reagent to react completely with the amount of compound to be removed from the feed. Any additional emulsion will enhance the driving force and improve contacting.

After the treatment has proceeded to a sufficient degree and the compound has been removed to the desired extent, the mixture 3 of feed and emulsion are separated in settler 4, unless this phase separation is inherent in the operation of the LM treater 2, such as in a countercurrent tower. In settler 4 spent emulsion 6 is separated from treated feed 5. The latter is removed from the system for further processing or discharge, while the spent emulsion 6 is fed to coalescer 7 for emulsion phase separation.

Coalescer 7 can operate on a number of demonstrated principles to demulsify the emulsion and allow separation of the two phases. Centrifugation to separate out clear excess external, i.e. membrane phase, coupled with mechanical agitation of the resultant heavy emulsion and recycle to the centrifugation step was shown to be one way to break the emulsion. Another method involves adding chemical solvents to the emulsion which result in breaking the emulsion into two phases, from which the solvents can be recovered by distillation. Lastly, electrostatic coalescing has been shown to be a very successful and simple method to recover the separate phases. This method is best performed with insulated electrodes, under a potential field of 10–30 kV and applying an AC of a frequency between 10 and 15000 Herz. Electrostatic coalescence is the preferred method of breaking liquid membrane emulsions.

The membrane phase 8 separated out in the coalescer is recycled directly to the emulsifier 13 to regenerate fresh emulsion, as will be discussed below. The spent internal phase 9 is withdrawn from coalescer 7 and fed to the bipolar membrane electrolysis cell 10. In this device, the spent internal reagent is regenerated as stream 11 and the dissolved substance, whether acid or base, which had been extracted from feed 1 into the liquid membrane emulsion 14 in treater 2 is produced as a separated stream 12, either as such, or in aqueous solution, but at a much higher concentration than present in the original feed 1. In this specific example, sodium phenate solution, which is the internal phase of the spent emulsion, is effectively converted into sodium hydroxide solution and a relatively concentrated aqueous solution of phenol.

Figure 2:
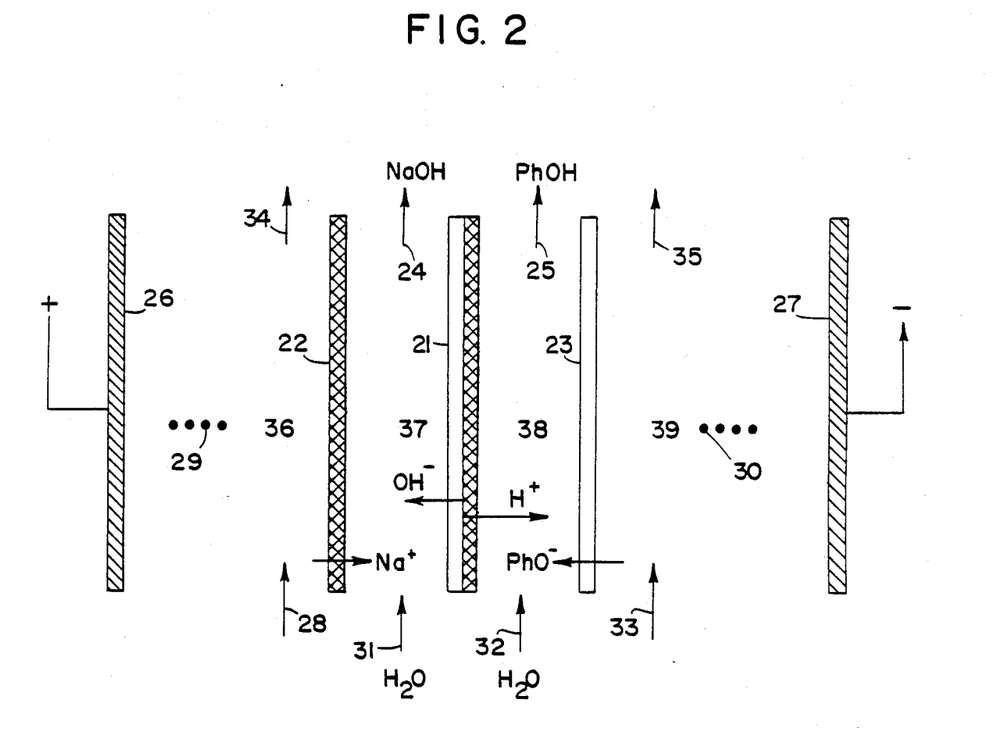
FIG. 2 is a cross-section through a unit cell for bipolar membrane electrolysis which is a part of the preferred embodiment shown in FIG. 1.

The operation of the bipolar membrane cell is illustrated in FIG. 2 for the specific case of converting the aqueous sodium phenate internal reagent solution of the spent emulsion into (a) an aqueous sodium hydroxide stream suitable for recycle to the emulsifier for preparation of fresh emulsion, and into (b) a concentrated solution of phenol in water suitable for phenol recovery by any of a number of conventional means, such as phase separation, distillation, steam stripping, or a combination of the above.

In FIG. 2, the unhatched rectangles represent cross-sections through membranes which only allow passage of negative ions, i.e. anion-permeable membranes, while cross-hatched rectangles signify membranes which only allow positive ions, i.e. cations to pass through. Such membranes are commercially available, and are frequently made from such resins as polystyrene which can be sulfonated or otherwise provided with charged sidechains, such as sulfonate groups or amine groups, which allow positive or negative ions, respectively, to permeate through the resin. Membranes which are indicated by both a unhatched and a cross-hatched rectangle are bipolar membranes, where one side of the membrane is permeable only to cations, while the other side is only anion permeable. When such a membrane is immersed in water, which is permeable through all of the above membranes, and an electric potential is applied across the membrane, water will dissociate into protons and hydroxide ions at the interface of the anion-permeable and cation-permeable membrane sides, and protons will migrate through the cation-permeable side of the bipolar membrane towards the cathode, while hydroxide ions will migrate in the opposite direction, through the anion-permeable side of the bipolar membrane, towards the anode. This property of the bipolar membrane is utilized in the bipolar electrolytic cell illustrated in FIG. 2 to carry out the decomposition of the salt in the spent internal reagent of the instant invention, sodium phenate in this example, into its constituent acid and base, phenol and sodium hydroxide, respectively.

The heart of the electrolytic cell is the bipolar membrane 21 which is placed, as shown, between anode 26 and cathode 27 in such a way that the anion-permeable side of membrane 21 faces the anode and the cation-permeable side faces the cathode. When an electric potential is applied between the cathode and the anode, $OH^-$ ions will issue from the bipolar membrane in the direction of the anode, and $H^+$ ions will issue in the cathode direction. In addition to the bipolar membrane 21, a cation-selective membrane 22 is placed in the cell on the anode side of 21, and an anion-selective membrane 23 is put between 21 and cathode 27. These membranes divide the cell into cell compartments 36, 37, 38, and 39. When spent internal reagent comprising sodium phenate is passed, as shown in streams 28, into the cell compartment 36 on the anode-side of the cation-selective membrane 22, $Na^+$ ion will migrate out of stream 28 through membrane 22 into the space between membrane 21 and 22, cell compartment 37. Consequently when a stream of water or aqueous solution 31 is introduced into that space, it will be enriched in both $OH^-$ and $Na^+$ ions, i.e. It will leave as a sodium hydroxide solution. Cell compartment 37 is, therefore, a base-generating compartment. Similarly, an aqueous stream 32 introduced into the cellular space 38 between membranes 21 and 23 will be enriched in $H^+$ ions issuing from the bipolar membrane 21 and phenate ions $PhO^-$ passing through anion-selective membrane 23, as a result of feeding a spent internal reagent stream 33 into the space 39 between membrane 23 and cathode 27. Consequently, stream 25 issuing from cell compartment 38 between membranes 21 and 23 will be enriched in phenol. Cell compartment 38 is, therefore, an acid-generating compartment. In contrast to conventional water electrolysis into its constituent gases, hydrogen and oxygen, which requires cell voltages in the order of 3-5 V per unit cell, bipolar elecrolysis into the constituent acid and base of the contained salt only requires cell voltages of the order of 2 volts per unit cell. Many of such repeating unit cell arrangements can be put in series between the anode 26 and cathode 27, as is shown schematically by dots 29 and 30, to make up a battery of electrolytic cells. Such a battery arrangement would have repeating membranes 22-21-23-22-21-23-22-21-23 . . . etc placed between an anode 26 and a cathode 27, thus forming repeated cell compartments . . . 37, 38, 39, 37, 38, 39 . . . . Note that compartments 36 and 39 are equivalent. Spent internal reagent such as stream 28 or 33 would be fed into compartments 39 in the above described arrangement, and water or an aqueous stream would be fed into compartments 37 and 38. Regenerated internal reagent, an aqueous solution of sodium hydroxide in this case, will issue from all base-generating cell compartments 37, and recovered phenol, in aqueous solution or suspension, will leave the cells from the acid-generating compartments 38. The liquid leaving the compartments 39, corresponding to streams 34 or 35, will be solutions of much lower sodium phenate salt content than present in the spent internal reagent fed to the cell, since $Na^+$ ions migrated out of this stream through membrane 22, and phenate ions migrated out in the opposite direction through membrane 23. In the order of 20 to 95% of the salt in streams 28 or 33 fed to the cell can be split into the constituent acid and base in a single pass through the cell, preferably 50-90%, most preferably 75-90%. Compartments 39, consequently, can be considered salt-depleting compartments. The effluent solution, since it is still rich in contained unconverted sodium phenate, containing between 5% to 80% of the sodium phenate in the spent internal reagent 28 or 33, will represent a disposal problem. This stream will also comprise any unused sodium hydroxide from the liquid membrane permeation, i.e. base which was not consumed in the extraction step to neutralize phenol permeating into the internal aqueous reagent dropets. It is particularly advantageous to recycle this stream to the cell, specifically as streams 31 or 32, but preferably as stream 31. While this will introduce some sodium phenate into the product sodium hydroxide solution 24, this presents no problem, since this solution is immediately recycled to fresh emulsion production, where a small phenate content of the fresh reagent does not interfere with adequate clean-up of the phenol in the plant feed. Similarly, a small sodium phenate content of the enriched phenol solution 25 leaving the cell is no problem, since pure phenol can be recovered from this stream by phase separation, extraction, distillation or steam stripping regardless of any sodium phenate contained therein. However, if streams 34 and 35 comprise an appreciable amount of sodium hydroxide, as explained above, because the internal reagent in the liquid membrane extraction operation was only partly consumed, then it is undesirable to recycle streams 34 or 35 to stream 32. Under these conditions, these streams should only be recycled to stream 31, which feeds the caustic regenerating cell compartment.

It has been found that it is advantageous to use as feed to cell compartment 38 another stream, which is rich in phenol and would represent a disposal problem. Stream 25, which is an aqueous stream rich in phenol, goes to a phenol recovery operation, not specifically shown in FIG. 1, where the regenerated phenol is recovered as mentioned beforehand by conventional means, such as distillation, phase separation, extraction or steam stripping. The aqueous raffinate from this operation will still contain small amounts of unrecovered phenol, and it is advantageous to use this stream as aqueous make-up stream 32 feeding the cell compartments 38 regenerating phenol and generating streams 25.

In summary, it is therefore preferable to recycle via 31 to cell compartments 37 the effluent 35 from the cell compartments 39 handling the spent internal reagent, stream 28, and to recycle via 32 to the cell compartments 38, regenerating the recovered dissolved acid, the aqueous raffinate from the operation in which said regenerated dissolved acid is recovered in concentrated form from the aqueous cell effluent 25. These recycles will, of course, be appropriatedly modified if the dissolved substance is a base and the internal reagent is an acid.

The recycle of these streams to the bipolar membrane cell as feed stream to acid and base-generating compartments is a particularly beneficial aspect of the present invention. It shows how the combination of bipolar membrane electrolysis and liquid membrane extraction surprisingly and synergistically improve each other by allowing weak points in each process to be strengthened. For example, this recycle of partially converted salt solution to the acid and base-generating compartments of the bipolar membrane cell overcomes the difficulty of that process that incomplete conversion of the salt results in process inefficiencies, environmental disposal problems, and frequently inefficient operation if high conversion is required to avoid this disposal problem. The inefficiency arises from the fact that a bipolar membrane cell operating with very low salt concentration in streams 34 and 35 requires high operating voltage, operates with high cell resistance, and is subject to undesirable leakages of reagents resulting in additional process inefficiencies. Since in the present process, partly depleted salt solution can be used as make-up solution in the bipolar cell for the acid and base-generating compartments, this difficulty is obviated.

By the same token, the bipolar cell diminishes the demand on the performance of the liquid membrane extraction process, on the utilization of the internal reagent, and allows the use of reagents which would be considered unacceptable on a once-through basis, be it for reasons of availability, cost, contamination or convenience. In addition, of course, it permits the recovery of the dissolved acid or base, which, up to now, had not been considered a feasible operation.

While the present example illustrates the invention with the specific case of the removal of a dissolved weak acid, specifically phenol, by the use of a liquid membrane emulsion comprising an encapsulated aqueous solution of a strong base, specifically sodium hydroxide, it is obvious to anybody skilled in the art that this novel combination can be employed for the removal of any weak acid, or mixtures of acids, using an emulsion comprising an encapsulated base, or for the removal of any weak base, or mixture of bases, using an emulsion comprising an encapsulated acid. The only provisions are that the dissolved weak acids or bases are somewhat soluble in the membrane phase of the emulsion, while the bases or acids encapsulated in the treating emulsions should not be able to permeate through the membrane phase, i.e. should not be soluble in the membrane phase. Weak acids which satisfy this condition of permeability are generally organic acids like phenols, carboxylic acids, and certain inorganic acids which are soluble in hydrocarbons, including hydrogen sulfide, hydrogen cyanide, and carbon dioxide or sulfur dioxide. Weak bases include ammonia, amines and many organic nitrogen compounds of a basic nature. Strong acids and bases which are suitable as treating agents encapsulated in the liquid membrane are inorganic acids and bases, e.g. sulfuric, hydrochloric and nitric acids, as well as the alkali and alkaline earth oxide based hydroxides. These materials are usually sufficiently highly ionized so that their membrane solubility is very low.

Recapitulating, and defining limits, the aqueous feed 1 comprising a dilute dissolved acid or base, referred to as a dissolved substance, is treated with a fresh liquid membrane emulsion 14 in treater 2 to remove from 20% to 99.98%, preferably 90 to 99.98% of said dissolved substance from feed 1. The treated feed 5 is withdrawn from the system after separation from the liquid membrane emulsion in settler 4 or the like.

The fresh liquid membrane emulsion 14 comprises a continuous oil or membrane phase and a dispersed aqueous internal phase which contains a reagent capable of neutralizing said dissolved substance and preventing its escape from the emulsion once it has permeated into the dispersed droplets of the internal phase. The amount of said reagent in said fresh emulsion 14 will be between 1.01–3 times the stoichiometric amount of said reagent required to neutralize the dissolved substance removed in the liquid membrane treating operation 2, preferably between 1.01–1.5 times the stoichiometric amount, most preferably between 1.1 and 1.5 times the stoichiometric amount. The spent emulsion 6 removed after the treating operation from the treated feed 5 will comprise a spent internal phase 9 which is separated from a continuous membrane phase in a coalescer 7 and sent to bipolar membrane electrolysis 10 where the internal reagent is regenerated and the extracted dissolved substance 12 is recovered. The spent internal reagent 9 is an aqueous solution comprising the recovered dissolved substance in the form of a salt with the reagent, together with between 0.01 and 2, preferably between 0.01 and 0.5, and most preferably between 0.1 and 0.5 times the stoichiometric amount of free, unneutralized reagent, compared with the amount of reagent required to neutralize the dissolved substance removed in the LM treater 2.

In the bipolar membrane electrolysis, at a voltage between 1.5 and 2.5 V per unit cell, the spent internal reagent 33, at first passage through the cell via compartment 39, will leave the cell as a stream 35, depleted in the salt formed from the dissolved substance recovered in treater 2 and the said internal reagent, but still comprising between 0.01 and 2 times the said stoichiometric amount of excess internal reagent, and also comprising some excess salt which may have been present in the internal reagent phase of the fresh emulsion 14. This excess salt, which circulates around in the fresh and spent emulsion, may be between 0.01 and 2 times the amount of salt formed by neutralization in LM treater 2. The salt depleted stream 35 can be discarded, but preferably it is fed to the reagent-regenerating compartment of the bipolar membrane cell. When the reagent is a base, this corresponds to stream 31 flowing through cell compartment 37 in FIG. 2, when the reagent is an acid, the corresponding stream is 32 flowing through compartment 38. The stream leaving the reagent-regenerating compartment will be an aqueous solution comprising between 1.01 and 3 times the stoichiometric amount of said reagent, and between 0.01 and 2 times the stoichiometric amount of salt, as discussed above. This stream is the regenerated internal reagent phase 11 of FIG. 1, ready for recycle to emulsifier 13.

The dissolved substance-regenerating compartment of the bipolar membrane electrolysis cell, if it is fed with an aqueous stream comprising between 0.01 and 0.5 times the amount of dissolved substance removed in treater 2, will regenerate essentially all of the removed dissolved substance, so that the stream leaving this cell compartment will comprise between 1.01 and 1.5 times the amount of dissolved substance removed in the LM treater. If the dissolved substance is an acid, the feed to the compartment corresponds to stream 32 in FIG. 2, the dissolved substance-regenerating compartment is 38, and the effluent corresponds to stream 25. If the dissolved substance is a base, the feed to the compartment corresponds to stream 31 in FIG. 2, the compartment is 37, and the effluent corresponds to stream 24. The effluent next goes for treatment to a dissolved substance recovery unit where the recovered dissolved substance is taken out of effluent stream 25 or 24, as the case may be. The amount of dissolved substance taken out of this stream is, at best, equal to the amount of dissolved substance removed in treater 2, so the amount of dissolved substance left in the treated effluent is between 0.01 and 0.5 times the amount of dissolved substance taken out in treater 2. As discussed previously, said treated effluent is a preferred feed to the dissolved substance-regenerating compartment of the bipolar membrane cell.

The regenerated internal reagent phase 11 and membrane phase 8 separated out in coalecer 7 are combined in emulsifier 13 to form fresh emulsion 14. The emulsion usually comprises an intimate mixture of the two phases, aqueous as the internal, dispersed phase, and oil as the continuous membrane phase in the volume ratio of between 10:1 and 1:10. The membrane phase comprises a hydrocarbon or mixture of hydrocarbons in the $C_7$ to $C_{20}$ range, together with a surfactant such as ENJ-3029 manufactured by Exxon Chemical Co. The surfactant concentration can range from 1 to 5 wt. % in the membrane phase. The membrane phase may also contain an oil soluble ion exchange resin, complexing agent or modifier to improve the solubility of the dissolved substance in the membrane phase, and thus to enhance the permeability of the dissolved substance through the membrane phase in the emulsion. Suitable substances are complexing agents like LIX64N marketed by General Mills Chemical Co., suitable for metal ions such as copper, Alamine (also manufactured by General Mills) for anion transfer, ethylene diamine tetraacetic acid (EDTA) for cation transfer, aliphatic alcohols to improve the solubility of organic acids in the membrane phase, and the like.

The following example will demonstrate the present invention. Again, it should be realized that because the example is restricted to phenol removal using aqueous caustic as the internal reagent, the general concept is far broader and can be used for the recovery of many dilute acids and bases.

EXAMPLE 1

PHENOL EXTRACTION ACCORDING TO THE PRESENT INVENTION

An aqueous waste stream flowing at the rate of 1000 l/h has a phenol content of 200 wt. ppm. It is fed to a liquid membrane extraction step, where it is contacted with a liquid membrane emulsion comprising as internal, dispersed reagent a 5 wt. % aqueous NaOH solution, also comprising 3.87 wt. % sodium phenate, and as membrane phase an oil phase comprising S100N, a hydrocarbon of about 35 carbon number and about 9% aromatics content, and as surfactant comprising 2 wt. % ENJ-3029. The ratio of membrane phase to aqueous phase in the emulsion is 2/1 by volume, and the emulsion is fed to the treater at the rate of 5.85 l/h. The treat ratio of emulsion to feed in the reactor is maintained at 1/5 vol/vol, but treated feed and spent emulsion are removed from the treating step by differential settling at the rate at which they are fed and accumulating, i.e. 1000 l/h for the treated feed, and about 6 l/h for the spent emulsion. In the treater 98% of the phenol is removed, so the treated feed will contain 4 wt. ppm of phenol. The composition of the aqueous phase in the fresh and spent emulsion is as shown in Table 1.

TABLE 1

| COMPOSITION OF AQUEOUS PHASE IN FRESH AND SPENT EMULSION | | |
|---|---|---|
| g/h | Fresh emulsion | Spent emulsion |
| NaOH | 104.26 | 20.85 |
| Na phenate | 80.62 | 322.50 |
| Water | 1900.22 | 1937.75 |
| Total | 2085.10 | 2281.10 |

The spent emulsion is broken, using an electrostatic coalescer, and the spent aqueous phase of composition as shown in Table 1 is sent to a bipolar membrane electrolytic cell operating at 2 V per unit cell potential. The spent aqueous phase is first sent through the salt-depletion compartment of the cell, where the salt content of the solution is reduced. The salt-depleted solution is then fed to the caustic-regenerating compartment of the cell, where caustic is increased back to the level in the aqueous phase of the fresh emulsion. These aqueous compositions are listed in Table 2.

TABLE 2

| COMPOSITIONS OF INTERNAL AQUEOUS PHASE IN BIPOLAR CELL | | | |
|---|---|---|---|
| g/l | Spent Aqueous | Salt-Depleted Aq. | Fresh Emulsion |
| NaOH | 20.85 | 20.85 | 104.26 |
| Na phenate | 322.50 | 322.50 | 80.62 |
| Water | 1937.75 | 1937.75 | 1900.22 |
| Total | 2281.10 | 2039.22 | 2085.10 |

The above regenerated internal aqueous reagent phase together with the membrane phase separated out in the coalescer are recombined in an emulsifier, where fresh liquid membrane emulsion is prepared.

An aqueous solution containing about 0.5 wt. % of phenol is fed to the phenol-generating compartment of the bipolar cell, where it is enriched in phenol which is being removed from the spent aqueous phase passing through the cell. The effluent from this cell compartment will contain about 4.8 wt. % phenol. This stream is sent to a phenol recovery unit, which treats this stream by steam stripping and distillation to remove the bulk of the phenol contained therein and recover it as pure phenol. The stripped residue is an aqueous solution containing about 0.5 wt. % phenol, which is recycled to the phenol-gathering compartment as described hereinabove.

No or very little chemical make-up of caustic or other materials is required in this operation, nor are there any waste liquids which need to be discarded and chemical products which involve complex disposal procedures.

EXAMPLE 2

PHENOL EXTRACTION USING LIQUID MEMBRANE EMULSION

An aqueous waste stream flowing at the rate of 1000 l/h has a phenol content of 200 wt. ppm. It is fed to a liquid membrane extraction step, where it is contacted with a liquid membrane emulsion comprising as internal, dispersed reagent a 5 wt. % aqueous NaOH solution, and as membrane phase an oil phase comprising S100N, a hydrocarbon of about 35 carbon number and about 9% aromatics content, and as surfactant comprising 2 wt. % ENJ-3029. The ratio of membrane phase to aqueous phase in the emulsion is 2/1 by volume, and the emulsion is fed to the treater at the rate of 5.80 l/h. The treat ratio of emulsion to feed in the reactor is maintained at 1/5 vol/vol, but treated feed and spent emulsion are removed from the treating step by differential settling at the rate at which they are fed and accumulating, i.e. 1000 l/h for the treated feed, and about 6 l/h for the spent emulsion. In the treater 98% of the phenol is removed, so the treated feed will contain 4 wt. ppm of phenol. The composition of the aqueous phase in the fresh and spent emulsion is as shown in the Table 3.

TABLE 3

COMPOSTION OF AQUEOUS PHASE IN FRESH AND SPENT EMULSION

| g/h | Fresh emulsion | Spent emulsion |
| --- | --- | --- |
| NaOH | 104.26 | 20.85 |
| Na phenate | — | 241.87 |
| Water | 1900.22 | 1937.75 |
| Total | 2004.48 | 2200.47 |

The spent emulsion is broken, using an electrostatic coalescer, and the spent aqueous phase of composition as shown in Table 1 is sent to disposal. Two alternate disposals can be carried out:

(a) The spent phenate solution, as such, can be discarded via biological sewage disposal, where the phenol will be digested by appropriate bacteria and converted into sludge.

(b) 133 g/h of 96% sulfuric acid are added to the spent aqueous phase. This liberates 196 g/h of phenol and forms 185 g/h of sodium sulfate. The phenol can be recovered from this solution by steam stripping and distillation. The remaining sodium sulfate solution will contain a small amount of residual phenol, and has to be discarded via a biopond.

In this operation, caustic and sulfuric acid were consumed, and disposal of the waste streams involved handling of environmentally harmful fluids.

EXAMPLE 3

BIPOLAR MEMBRANE ELECTROLYSIS OF PHENOL-CONTAINING WASTE WATER STREAM

The waste water stream of Examples 1 and 2 is fed directly to a bipolar membrane electrolysis cell, operating at a potential of 2 V. No separation takes place, since the phenol is present in very dilute form, as such, and not as a salt.

If caustic is added to the waste water to neutralize the phenol before feeding the resultant dilute sodium phenate salt solution to the bipolar cell, separation into a very dilute phenol containing aqueous stream and a very dilute caustic stream takes place at a potential considerably higher than 2 V, and the product streams, particularly the dilute phenol stream, present an obvious disposal problem equal to or surpassing that posed by the original feed.

EXAMPLE 4

BIPOLAR MEMBRANE ELECTROLYSIS OF CONCENTRATED AQUEOUS SODIUM PHENATE SOLUTION

A sodium phenate solution of composition equal to that of the spent aqueous internal reagent phase shown in Table 1 of Example 1 is sent to a bipolar membrane electrolysis cell where 75% of the salt is decomposed into its constituent sodium hydroxide and phenol. The salt-depleted effluent from this operation has the composition shown in Table 2 of Example 1 under "Salt-depleted Aq.", and is discarded. Recovery of additional phenol and caustic from this stream requires much higher than 2 V potential and results in considerable amounts of impurities being introduced into the caustic and phenol product streams, specifically phenol into the caustic stream, and caustic into the phenol stream. The discard of the salt-depleted effluent not only intails a loss of caustic and phenol, but also involves disposal of an environmentally harmful fluid. The recovered caustic is relatively dilute, about 5 wt. % and represents a stream of marginal market value.

Example 1 shows how the process of the present invention operates beneficially in a specific, though not limiting example, reducing a contaminant in a waste water stream, with minimal requirements of chemicals, with the potential production of the waste product as a marketable commodity, and without the formation of waste streams which are disposal problems in themselves.

Example 2 illustrates that liquid membrane emulsion treatment by itself achieves the contaminant reduction, but requires considerable chemical make-up and introduces waste disposal problems of its own. Example 3 and 4 show that bipolar electrolysis alone will not solve the contaminant removal problem, while Example 4 further demonstrates that bipolar electrolysis of a concentrated sodium phenate solution, by itself, is not a chemically efficient nor an environmentally satisfactory operation.

What is claimed is:

1. A process for removing a dissolved substance selected from the group consisting of an acid, a base, a number of acids and a number of bases, from an aqueous feedstream comprising:

(a) contacting said feedstream with a fresh emulsion having a continuous membrane phase immiscible with the feedstream and permeable to said dissolved substance, and an aqueous dispersed phase comprising a reagent capable of reacting with said dissolved substance, under conditions which permit 20 to 99.99% of the dissolved substance in the feedstream to be removed from the feedstream and be absorbed into said emulsion;

(b) removing said emulsion from said feedstream after treatment according to step (a) and demulsifying said removed emulsion into the continuous membrane and the dispersed aqueous phases;

(c) subjecting said demulsified dispersed aqueous phase from step (b) to bipolar membrane electrolysis to recover an aqueous stream rich in said reagent and an aqueous stream rich in the dissolved substance which had been absorbed into the emulsion in step (a);

(d) recombining by emulsification the said aqueous stream rich in said reagent from step (c) with the said membrane phase from step (b) to form said fresh emulsion used in step (a).

2. A process according to claim 1 wherein said reagent reacts by neutralization with said dissolved substance in step (a) to convert it into a salt, in which form it is incapable of permeating through the membrane phase of the emulsion.

3. A process according to claim 2 wherein the amount of said reagent is between 1.01 and 3 times the stoichiometric amount of said reagent required to neutralize the amount of said dissolved substance absorbed by the emulsion in step (a).

4. A process according to claim 2 wherein the amount of said reagent is between 1.01 and 1.5 times the stoichiometric amount of said reagent required to neutralize the amount of said dissolved substance absorbed by the emulsion in step (a).

5. A process according to claim 2 wherein the amount of said reagent is between 1.1 and 1.5 times the stoichiometric amount of said reagent required to neutralize the amount of said dissolved substance absorbed by the emulsion in step (a) of claim 1.

6. A process according to claim 2 where, when the dissolved substance is selected from the group consisting of an acid and a number of acids, said reagent is a strong inorganic base.

7. A process according to claim 2 where, when the dissolved substance is selected from the group consisting of a base and a number of bases, said reagent is a strong inorganic acid.

8. A process according to claim 2 wherein the aqueous dispersed phase of said fresh emulsion also comprises some salt formed by the reaction of said dissolved substance and said reagent, and wherein the amount of said salt in the fresh emulsion is between 0.01 and 2 times the amount of salt formed by the reaction of said reagent and said dissolved substance absorbed into said emulsion in step (a).

9. A process according to claim 1 wherein the amount of dissolved substance removed from the feedstream in step (a) is between 90 and 99.98% of the amount of said dissolved substance in the feed.

10. A process according to claim 1 wherein, in the bipolar membrane electrolysis in step (c), where the cell has (i) at least one salt-depleting compartment to which the said dispersed aqueous phase is fed, (ii) at least one reagent-regenerating compartment, and (iii) at least one dissolved substance-regenerating compartment, at least part of the effluent from said salt-depleting compartment of the cell is fed to said reagent-regenerating compartment of the cell.

11. A process according to claim 1 wherein, in the bipolar membrane electrolysis in step (c), where the cell has (i) at least one salt-depleting compartment to which the said dispersed aqueous phase is fed, (ii) at least one reagent-regenerating compartment, and (iii) at least one dissolved substance-regenerating compartment and wherein the effluent from said dissolved substance-regenerating compartment is subjected to further processing by a recovery step to recover said dissolved substance out of said effluent, and wherein the residue from said recovery step may still contain some dissolved substance, at least part of the residue from said recovery step is recycled to the bipolar membrane electrolysis and is fed to said dissolved substance-regenerating compartment.

12. A process according to claim 8 in which between 20 and 95% of the salt fed to the bipolar electrolysis cell is converted into reagent for recycle to step (d) and into recovered dissolved substance.

13. A process according to claim 8 in which between 50 and 90% of the salt fed to the bipolar electrolysis cell is converted into reagent for recycle to step (d) and into recovered dissolved substance.

14. A process according to claim 8 in which between 75 and 90% of the salt fed to the bipolar electrolysis cell is converted into reagent for recycle to step (d) and into recovered dissolved substance.

15. A process for removing and recovering phenol from an aqueous feedstream by treatment with a fresh emulsion comprising a dispersed aqueous phase comprising both sodium hydroxide and sodium phenolate, maintaining contact between the emulsion and feedstream for sufficiently long time and under enough agitation to remove more than 90% of the phenol in the feedstream, absorbing said phenol into the emulsion, separating the treated feed from the spent emulsion, demulsifying the spent emulsion in an electrostatic coalescer into a spent aqueous dispersed phase and an oil-based membrane phase, subjecting said spent aqueous dispersed phase to bipolar membrane electrolysis in a cell having at least (i) one salt-depleting compartment, (ii) one caustic-regenerating compartment, and (iii) one phenol-regenerating compartment, feeding said spent aqueous dispersed phase to said salt-depleting compartment, and feeding the effluent from this compartment to said caustic-regenerating compartment, feeding the effluent from this caustic-regenerating compartment to an emulsification step together with the membrane phase separated out in said electrostatic coalescer to make said fresh emulsion, and subjecting the effluent from said phenol-regenerating compartment to distillation to recover phenol in concentrated form, and recycling the aqueous residue from said distillation as feed to said phenol-regenerating compartment.

* * * * *